US010251141B2

(12) United States Patent
Shibuta et al.

(10) Patent No.: US 10,251,141 B2
(45) Date of Patent: Apr. 2, 2019

(54) COMMUNICATION APPARATUS AND COMMUNICATION SYSTEM

(71) Applicant: Panasonic Intellectual Property Management Co., Ltd., Osaka (JP)

(72) Inventors: Akira Shibuta, Fukuoka (JP); Hiroyuki Ishihara, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 196 days.

(21) Appl. No.: 15/292,865

(22) Filed: Oct. 13, 2016

(65) Prior Publication Data

US 2017/0127364 A1 May 4, 2017

(30) Foreign Application Priority Data

Oct. 30, 2015 (JP) .................. 2015-214115

(51) Int. Cl.
*H04W 56/00* (2009.01)
*H04W 72/04* (2009.01)
*H04W 84/12* (2009.01)

(52) U.S. Cl.
CPC ..... *H04W 56/001* (2013.01); *H04W 72/0446* (2013.01); *H04W 84/12* (2013.01)

(58) Field of Classification Search
CPC ........... H04W 56/001; H04W 72/0446; H04W 84/12
See application file for complete search history.

(56) References Cited

U.S. PATENT DOCUMENTS 7,190,703 B1 3/2007 Heitmann
2013/0272277 A1* 10/2013 Suwa ................ H04W 56/0015
370/336

FOREIGN PATENT DOCUMENTS

JP 2003-509973 A 3/2003
JP 2007-124633 A 5/2007

* cited by examiner

*Primary Examiner* — Joseph A Bednash
(74) *Attorney, Agent, or Firm* — Seed IP Law Group LLP

(57) ABSTRACT

A communication apparatus communicating with a plurality of another communication apparatuses through a network, includes a processor; and a communication device, in which the communication apparatus and the plurality of the other communication apparatuses are separated for each synchronous system, the processor generates a first time slot including a plurality of slots for communicating a synchronous message used in a first synchronous system, and generates a second time slot including a plurality of slots for communicating a synchronous message used in a second synchronous system, and the communication device transmits the synchronous message in a multicast manner in a first slot of the first time slot in the first synchronous system, and transmits the synchronous message in the multicast manner in a second slot different from the first slot of the second time slot in the second synchronous system.

4 Claims, 8 Drawing Sheets

FIG. 4

| | MESSAGE | TRANSMISSION SIDE | RECEPTION SIDE | TYPE |
|---|---|---|---|---|
| Slot0 | Sync | Master | ENTIRE SLAVE | Multicast |
| Slot1 | DelayReq | Slave1 | Master | Unicast |
| | DelayResp | Master | Slave1 | Unicast |
| Slot2 | DelayReq | Slave2 | Master | Unicast |
| | DelayResp | Master | Slave2 | Unicast |
| Slot3 | DelayReq | Slave3 | Master | Unicast |
| | DelayResp | Master | Slave3 | Unicast |
| ... | | | | |
| Slot98 | DelayReq | Slave98 | Master | Unicast |
| | DelayResp | Master | Slave98 | Unicast |
| Slot99 | DelayReq | Slave99 | Master | Unicast |
| | DelayResp | Master | Slave99 | Unicast |
| Slot0 | Sync | Master | ENTIRE SLAVE | Multicast |
| Slot1 | DelayReq | Slave1 | Master | Unicast |
| | DelayResp | Master | Slave1 | Unicast |
| Slot2 | DelayReq | Slave2 | Master | Unicast |
| | DelayResp | Master | Slave2 | Unicast |
| Slot3 | DelayReq | Slave3 | Master | Unicast |
| | DelayResp | Master | Slave3 | Unicast |
| ... | | | | |
| Slot98 | DelayReq | Slave98 | Master | Unicast |
| | DelayResp | Master | Slave98 | Unicast |
| Slot99 | DelayReq | Slave99 | Master | Unicast |
| | DelayResp | Master | Slave99 | Unicast |
| Slot0 | Sync | Master | ENTIRE SLAVE | Multicast |
| Slot1 | DelayReq | Slave1 | Master | Unicast |
| | DelayResp | Master | Slave1 | Unicast |
| ... | | | | |

TS

TIME

COMMUNICATION APPARATUS AND COMMUNICATION SYSTEM

BACKGROUND

1. Technical Field

The present disclosure relates to a communication apparatus and a communication system.

2. Description of Related Art

In the related art, a technology relating to synchronization in a communication system is known (for example, see PCT Japanese Translation Patent Publication No. 2003-509973 and Japanese Patent Unexamined Publication No. 2007-124633).

In PCT Japanese Translation Patent Publication No. 2003-509973, a synchronization method of a plurality of base stations in a mobile communication network is described. In the synchronization method, time information is transmitted to a plurality of base stations, through a local area network (LAN), and a clock generator of each base station that receives the time information is adjusted based on a reception time and time information content of the time information. In addition, in the synchronization method, transmission of a function sequence according to a wireless time frame with respect to each base station is controlled based on a signal of the clock generator.

In Japanese Patent Unexamined Publication No. 2007-124633, a communication apparatus in which each of a plurality of communication apparatuses connected by a wireless LAN performs synchronization of a time of watch means is described. The communication apparatus includes watch means for indicating a time, time detection means, first frame recognition means, and second frame transmission means. The time detection means detects reception or transmission of a specific first frame transmitted to the plurality of communication apparatuses in the wireless LAN. The first frame recognition means determines a first frame detection time which is a time at which the reception or transmission of the first frame is detected based on a time indicated by the watch means. The second frame transmission means transmits a second frame including first frame detection time information to an external communication apparatus, through the wireless LAN.

In the technology of PCT Japanese Translation Patent Publication No. 2003-509973 and Japanese Patent Unexamined Publication No. 2007-124633, synchronization accuracy between the plurality of communication apparatuses is insufficient.

SUMMARY

The present disclosure in view of the above circumstances is to provide a communication apparatus and a communication system capable of improving synchronization accuracy between a plurality of communication apparatuses.

According to the present disclosure, there is provided a communication apparatus communicating with a plurality of another communication apparatuses through a network, including a processor and a communication device. The communication apparatus and the plurality of the other communication apparatuses are separated for each synchronous system. The processor generates a first time slot including a plurality of slots for communicating a synchronous message used in a first synchronous system, and generates a second time slot including a plurality of slots for communicating a synchronous message used in a second synchronous system. The communication device transmits the synchronous message in a multicast manner in a first slot of the first time slot in the first synchronous system, and transmits the synchronous message in the multicast manner in a second slot different from the first slot of the second time slot in the second synchronous system.

According to the present disclosure, it is possible to improve the synchronization accuracy between the plurality of communication apparatuses.

BRIEF DESCRIPTION OF THE DRAWINGS

FIG. 4 is a schematic diagram illustrating an example of a time slot at the time of performing the synchronization processing between a plurality of CSs;

DETAILED DESCRIPTION

Figure 1:
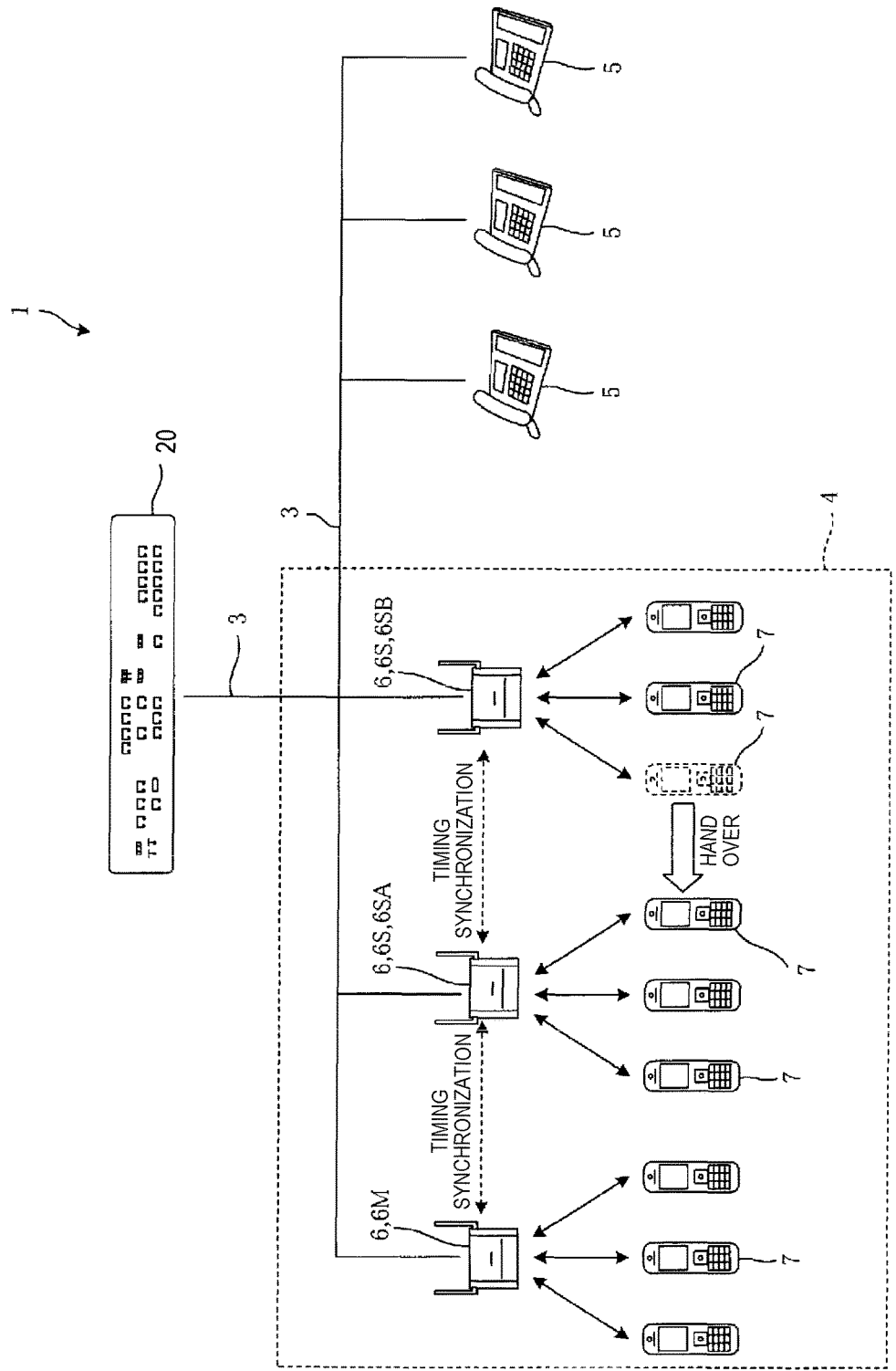
FIG. 1 is a block diagram illustrating a schematic configuration example of a communication system of a first embodiment.

Hereinafter, with reference to appropriate drawings, an exemplary embodiment will be described in detail. However, there is a case where an excessive detail description is omitted. For example, there is a case where duplicate explanation with respect to a detailed description that is already well known or substantially the same configuration is omitted. This is to avoid that following description will be unnecessarily redundant, and facilitate understanding of those skilled in the art. Note that accompanying drawings and description below are provided such that, those skilled in the art sufficiently understand the present disclosure, and not intended to limit the subject matter described in the claims.

Premise for Achieving Embodiment of Present Disclosure

As a synchronization technology of each communication apparatus in a communication system including a plurality of communication apparatuses, IEEE 1588 Ver. 2 is known. In the IEEE 1588 Ver. 2, synchronization is performed by using a high precise time protocol (PTP).

In the communication system using PTP, communication apparatuses to be synchronized with each other are divided into a master apparatus and a slave apparatus other than the master apparatus. For example, synchronous messages are transmitted from the master apparatus to the slave apparatus, and messages are exchanged between the master apparatus and the slave apparatus.

In the synchronization method described in PCT Japanese Translation Patent Publication No. 2003-509973, there is a possibility that message exchange with respect to a number of slave apparatuses is intensively generated in the master apparatus, in a case where the number of the slave apparatuses in response to the synchronous message transmitted from the master apparatus is large (for example, 100 units). In this case, for example, a load (traffic) on the network and processing load (for example, processing load of CPU) of the master apparatus are temporally excessively increased, and delay of processing due to the master apparatus is generated. As a result, there is a possibility that deviation in the synchronization of time is generated between the master apparatus and the slave apparatus.

In the communication apparatus described in Japanese Patent Unexamined Publication No. 2007-124633, synchronous frames are transmitted by wireless, and the synchronization may be also continuously failed with respect to another slave apparatus, in a case where one slave apparatus among a plurality of slave apparatuses fails in the synchronization. Accordingly, for example, in a case where the number (for example, 100 units) of the slave apparatuses is large, a possibility to be failed in the synchronization is increased.

Furthermore, it is also expected that the synchronization of a lot of slave apparatuses (for example, 1000 units) is managed by the master apparatus.

Hereinafter, the communication apparatus and the communication system capable of improving the synchronization accuracy between the plurality of communication apparatuses will be described.

The communication system of the following embodiment is applied to, for example, an internet protocol (IP)—private branch exchange (PBX) system.

The communication system of the following embodiment is applied to, for example, an IP—digital enhanced cordless telecommunication (DECT)—cell station (CS) connected to IP-PBX.

First Embodiment

Configuration or the Like

FIG. 1 is a schematic diagram illustrating a schematic configuration example of communication system 1 in the embodiment. Communication system 1 includes IP-PBX main device 20, IP-DECT-CS 4, and IP telephone terminal 5. For example, IP-DECT-CS 4 is connected to IP-PBX main device 20 by a wire, via LAN 3 (for example, ethernet (registered trademark)). For example, IP telephone terminal 5 is connected to IP-PBX main device 20 by a wire, via LAN 3.

For example, IP-PBX main device 20 is a device that performs line exchange of IP-DECT slave terminal 7 under IP telephone terminal 5 or the cell station (CS), in an IP network. For example, IP-PBX main device 20 may be also a dedicated device that performs the line exchange, and may be also a general-purpose server having a function of the line exchange. For example, by using IP-PBX main device 20, an extension telephone network by an IP telephone can be constructed in a company, a store, or a call center.

IP-DECT-CS 4 includes cell station (CS) 6 as a plurality of base stations capable of performing wireless communication of IP-DECT slave terminal 7. CS 6 includes master CS 6M operated as the master and slave CS 6S operated as a slave. Master CS 6M manages the synchronization of slave CS 6S. In FIG. 1, each of three CSs 6 is connected to LAN 3, and can perform communication with IP-PBX main device 20 and communication between CSs 6. CS 6 is an example of the communication apparatus.

In FIG. 1, one CS 6 among three CSs 6 is set as master CS 6M, and remaining two CSs 6 are set as slave CSs 6SA and 6SB. Whether CS 6 is operated as master CS 6M or operated as slave CS 6S is also set by, for example, a maintenance console of IP-PBX main device 20, and CS 6 is also operated by being separately manufactured as a master dedicated device or a slave dedicated device from the time of production. In the latter case, it is also possible to mount a high-performance CPU on the master dedicated device, or increase the number of accommodations by implementing a synchronous master dedicated device not having an audio communication function.

Master CS 6M and slave CSs 6SA and 6SB are synchronized via LAN 3 so as to perform seamless communication between CSs 6M and 6S by IP-DECT slave terminal 7. For example, the seamless communication means that communication is handed over without interruption.

IP-DECT slave terminal 7 is a portable communication terminal, and performs communication with, for example, CS 6 having the strongest electric wave intensity. IP-DECT slave terminal 7 communicates with CS 6 by using DECT. For example, IP-DECT slave terminal 7 switches CS 6 of a communication destination, and starts (hand over) communication with another CS 6, in a case where a sign of deterioration in the communication state with CS 6 of the communication destination is observed, in accordance with movement of IP-DECT slave terminal 7. Accordingly, in a case where the number of CSs 6 is large, a number of IP-DECT slave terminals 7 can be disposed, and an area in which communication can be performed can be increased. The case where the sign of deterioration in the communication state with CS 6 of the communication destination is observed is a case where, for example, the electric wave intensity or communication quality monitored with CS 6 of the communication destination is lowered compared to those with another periphery CS 6.

In FIG. 1, the number of CSs 6 is three in IP-DECT-CS 4, but not limited to the number of units. However, the number of slave CSs 6S is set within resource capacity of master CS 6M (for example, processing capacity of CPU) on a relationship in which slave CSs 6SA and 6SB are synchronized with master CS 6M. Communication system 1 includes at least a plurality of CSs 6.

As described below, master CS 6M and slave CS 6S are divided into a plurality of synchronous systems. Specifically, in order to improve synchronization management capacity by master CS 6M, a synchronization management function within master CS 6M is divided into multiple functions. That is, each of a plurality of masters M (see FIG. 2 and FIG. 5) within master CS 6M has the synchronization management function of slave CS 6S under of masters M.

For example, each of masters M is individually divided into hardware of a processor such as a CPU and the like, in master CS 6M.

One synchronous system is formed by disposing a plurality of slave CSs 6S with respect to one master M. The number of slave CSs 6S in one synchronous system is set within resource capacity (for example, processing capacity of CPU) of master M, similar to the above.

Figure 2:
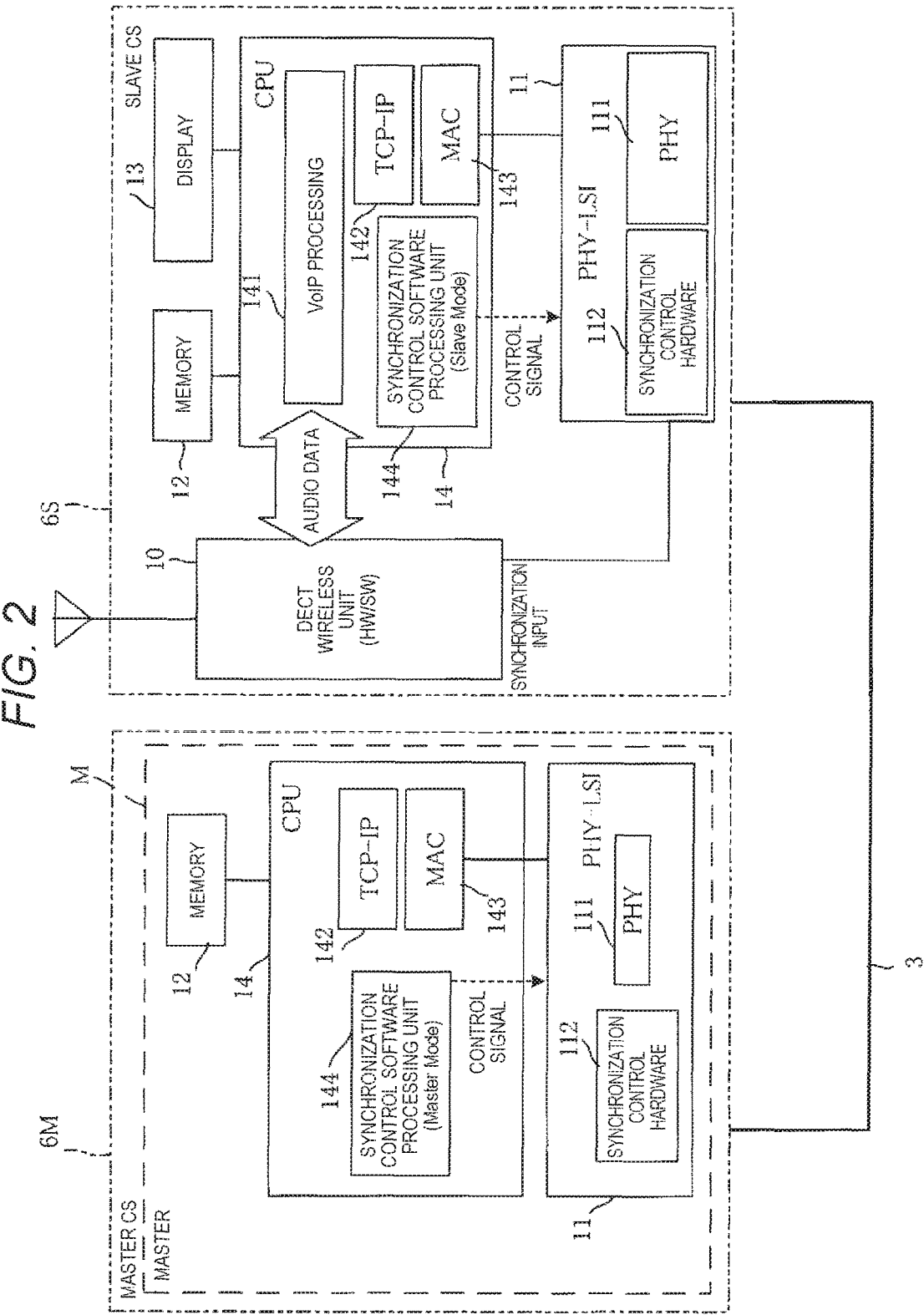
FIG. 2 is a block diagram illustrating a configuration example of a master cell station (CS) and a slave CS.

FIG. 2 is a block diagram illustrating a configuration example of master CS 6M and slave CS 6S. As illustrated in FIG. 2, a different point between master CS 6M and slave CS 6S is presence or absence of DECT wireless unit 10, display 13, and voice over internet protocol processing unit 141 (VoIP), as described below.

Master CS 6M includes physical layer (PHY)—large scale integration (LSI) 11, memory 12, and central processing unit (CPU) 14. CPU 14 has each function of transmission control protocol (TCP)—internet protocol (IP) block 142, media access control (MAC) block 143, and synchronization control software processing unit 144, by executing a program held in memory 12.

In FIG. 2, although a detail illustration is omitted, master CS 6M includes a plurality of masters M. The configuration of each master M is the same. Each of masters M includes PHY-LSI 11, memory 12, and CPU 14.

In addition, slave CS 6S includes DECT wireless unit 10, PHY-LSI 11, memory 12, display 13, and CPU 14. CPU 14 has each function of VoIP processing unit 141, TCP-IP block 142, MAC block 143, and synchronization control software processing unit 144, by executing a program held in memory 12.

DECT wireless unit 10 includes hardware (11W) and software (SW) for wireless communicating with IP-DECT slave terminal 7 according to the DECT method. DECT wireless unit 10 receives a clock signal generated from synchronization control hardware 112 described below, and is operated by being synchronized with the clock signal.

PHY-LSI 11 includes PHY block 111 and synchronization control hardware 112.

For example, PHY block 111 performs processing in a PHY layer for communicating a voice over internet protocol (VoIP) packet with another VoIP apparatus, through LAN 3 (for example, ethernet (registered trademark)). For example, the other VoIP apparatus includes another CS 6 and IP telephone terminal 5.

Synchronization control hardware 112 includes a hardware accelerator that conforms to IEEE 1588 Ver. 2. Synchronization control hardware 112 has a hardware function for generating a clock, and synchronizing time information and a clock rate of timestamp having therein with a timing master by IEEE 1588 Ver. 2 protocol. In the embodiment, the timing master is master CS 6M. In FIG. 2, synchronization control hardware 112 included in PHY-LSI 11 is exemplified, but may be also included in another configuration unit.

For example, VoIP processing unit 141 converts bidirectional voice data wirelessly communicating with IP-DECT slave terminal 7 into a VoIP packet. For example, VoIP processing unit 141 transmits and receives voice data to and from DECT wireless unit 10.

TCP-IP block 142 performs processing in a TCP layer and an IP layer for communicating the VoIP packet with another VoIP apparatus via LAN 3. MAC block 143 performs processing in a MAC layer for communicating the VoIP packet with the other VoIP apparatus via LAN 3. In FIG. 2, MAC block 143 included in CPU 14 is exemplified, but may be also included in another configuration unit.

Synchronization control software processing unit 144 processes software for realizing synchronization by the IEEE 1588 Ver. 2 protocol, by controlling synchronization control hardware 112 of PHY-LSI 11. For example, CPU 14 executes a program stored in memory 12 such that a function of synchronization control software processing unit 144 is realized.

Synchronization control software processing unit 144 has two modes of a master and a slave. In the embodiment, a master mode is set in synchronization control software processing unit 144 of master CS 6M, and a slave mode is set in synchronization control software processing unit 144 of slave CS 6S.

For example, synchronization control software processing unit 144 performs an initial setting and phase locked loop (PLL) control of own CS, and controls the phase of clock and a clock rate of own CS. For example, synchronization control software processing unit 144 calculates the propagation delay time with master CS 6M based on the communication of the synchronous message, and corrects the clock of own CS based on the propagation delay time, in a case of the slave mode. In this case, synchronization control software processing unit 144 has a function as a clock correction unit.

For example, TCP-IP block 142, MAC block 143, and PHY block 111 have a function as a communication unit that communicates the synchronous message.

For example, memory 12 includes a read only memory (ROM) and a random access memory (RAM). Memory 12 stores various data, information, and programs.

For example, display 13 displays various data and information.

Next, a communication example of the synchronous message between master CS 6M and slave CSs 6SA and 6SB will be described.

Figure 3:
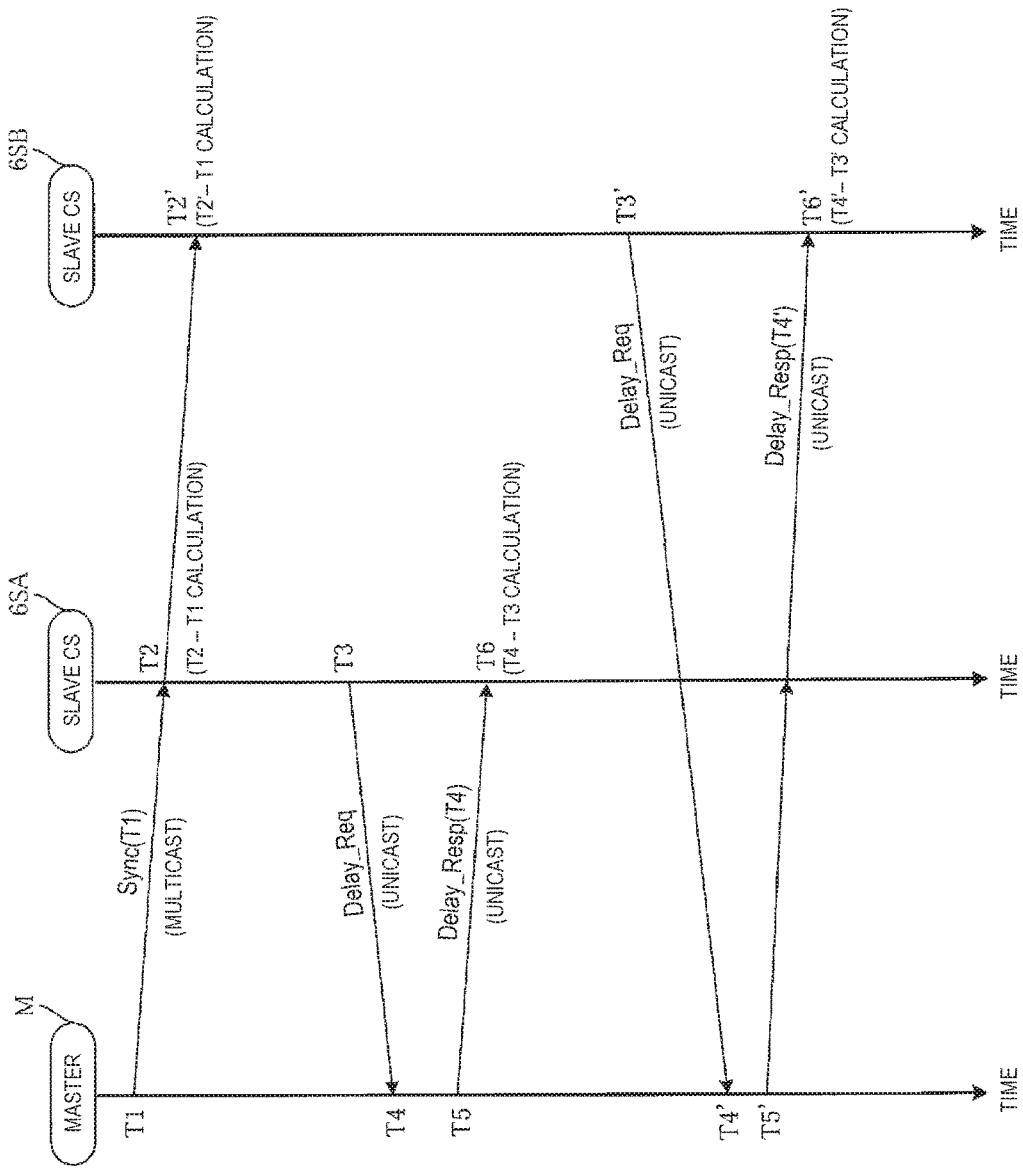
FIG. 3 is a sequence diagram illustrating an example of synchronization processing according to the communication system.

FIG. 3 is a sequence diagram illustrating the communication example of the synchronous message between master CS 6M and slave CSs 6SA and 6SB. In the embodiment, for each of the synchronous system, master M and slave CS 6S under master M communicate the synchronous message, and are synchronized. PHY-LSI 11 of master M of each synchronous system mutually performs synchronization between chips (see FIG. 5). Therefore, master CS 6M and a plurality of slave CSs 6SA, 6SB, . . . , are synchronized in the same manner, without depending on whether synchronization processing is performed by which master M.

For example, in the sequence of FIG. 3, the synchronous message is communicated according to IEEE 1588 Ver. 2 protocol (PTP). For example, in PTP, a time (=phase) and a frequency are synchronized based on a packet. For example, in PTP, the synchronization is performed by packet message exchange between master M and slave CS 6S. For example, in PTP, a hardware timestamp is used in master M and slave CS 6S. For example, in PTP, installation of a PTP dedicated line is not required, and there is a possibility that mixing with user traffic is generated.

In time T1, PHY-LSI 11 of master M transmits a Sync message in a multicast manner to slave CSs 6SA and 6SB. For example, the Sync message is transmitted by packet units. For example, the Sync message includes information of a transmission time (T1) of the message attached by synchronization control hardware 112 of master M. The Sync message is also described simply as "Sync". The Sync message including time (Tx) is also described simply as Sync (Tx).

In time T2, PHY-LSI 11 of slave CS 6SA receives Sync (T1), and obtains information of a reception time (T2) of the message by referring an internal timestamp. Synchronization control software processing unit 144 of slave CS 6SA calculates T2−T1 by using the information of time T1 included in the Sync message and the obtained information of time T2.

In time T3, PHY-LSI 11 of slave CS 6SA transmits a Delay_Request message in a unicast manner to master M, in response to the received Sync message. For example, the Delay_Request message is transmitted by packet units. The Delay_Request message is also described simply as "Delay_Req". PHY-LSI 11 of slave CS 6SA obtains a transmission time (T3) of the message, and stores the transmission time in, for example, memory 12, by referring the internal timestamp.

In time T4, PHY-LSI 11 of master M receives the Delay_Req, and obtains the information of a reception time (T4) of the message, by referring the internal timestamp.

In time T5, PHY-LSI 11 of master M transmits a Delay_Response message for the received Delay_Req in the unicast manner to slave CS 6SA. For example, the Delay_Response message is transmitted by packet units. The Delay_Response message is also described simply as "Delay_Resp". For example, the Delay_Resp includes information of time T4. That is, PHY-LSI 11 of master M transmits a Delay_Resp (T4).

In time T6, PHY-LSI 11 of slave CS 6SA receives the Delay_Resp (T4), and obtains the information of a reception time (T4) included in the message, by referring the internal timestamp. Synchronization control software processing unit 144 of slave CS 6SA calculates T4−T3 by using the information of time T4 included in the Delay_Resp (T4) and the stored information of time T3.

The total value of a value of (T2−T1) and a value of (T4−T3) which are calculated indicates a round-trip delay time between master CS 6M and slave CS 6SA. A half value of the round-trip delay time indicates an average value of a one-way delay time, and is also referred to as the "propagation delay time". For example, synchronization control hardware 112 and synchronization control software processing unit 144 of slave CS 6SA adjust the phase (=time) of clock and a clock rate of slave CS 6SA, so as to coincide the value of (T2−T1) and the value of (T4−T3) to the propagation delay time. With this, it is possible to synchronize the clock of slave CS 6SA with the clock of master M (that is, master CS 6M), and eliminate deviation of both times.

Similarly, in time T2', PHY-LSI 11 of slave CS 6SB receives Sync (T1), and obtains the information of a reception time (T2') of the message, by referring the internal timestamp. Synchronization control software processing unit 144 of slave CS 6SB calculates T2'−T1, by using the information of time T1 included in the Sync message and the obtained information of time T2'.

In time T3', PHY-LSI 11 of slave CS 6SB transmits Delay_Req to master M in the unicast manner, in response to the received Sync message. PHY-LSI 11 of slave CS 6SB obtains a transmission time (T3') of the message, and stores the transmission time (T3') in, for example, memory 12, by referring the internal timestamp.

In time T4', PHY-LSI 11 of master M receives Delay_Req from slave CS 6SB, and obtains the information of reception time (T4') of the message, by referring the internal timestamp.

In time T5', PHY-LSI 11 of master M transmits the Delay_Resp for the received Delay_Req in the unicast manner to slave CS 6SB. For example, Delay_Resp includes the information of time T4'. That is, PHY-LSI 11 of master M transmits Delay_Resp (T4').

In time T6', PHY-LSI 11 of slave CS 6SB receives Delay_Resp (T4'), and obtains the information of a reception time (T4') included in the message, by referring the internal timestamp. Synchronization control software processing unit 144 of slave CS 6SB calculates T4'−T3', by using information of time T4' included in Delay_Resp (T4') and the stored information of time T3'.

The total value of a value of (T2'−T1) and a value of (T4'−T3') which are calculated indicates a round-trip delay time between master M and slave CS 6SB. A half value of the round-trip delay time indicates an average value of a one-way delay time, and is also referred to as the "propagation delay time". For example, synchronization control hardware 112 and synchronization control software processing unit 144 of slave CS 6SB adjust the phase of the clock and a clock rate of slave CS 6SB, so as to coincide the value of (T2'−T1) and the value of (T4'−T3') to the propagation delay time. With this, it is possible to synchronize the clock of slave CS 6SB with the clock of master M (that is, master CS 6M), and eliminate deviation of both times.

As illustrated in FIG. 3, each of slave CSs 6S refers to master M of the synchronous system including own CS, and performs synchronization processing. Slave CS 6S performs processing with master M without performing processing with another slave CS 6S, by communicating the synchronous messages (for example, Delay_Req and Delay_Resp) in the unicast manner.

In master M, processing with each of slave CSs is not concentrated or the concentration is alleviated, in a case where the synchronous messages (for example, Delay_Req and Delay_Resp) are communicated in the unicast manner and in a case where communication timings in the communication of the unicast manner are different from each other. Therefore, it is possible to suppress the lack (for example, lack of ability of CPU) of resources of master CS 6M.

Next, time slot TS in communication system 1 will be described.

FIG. 4 is a schematic diagram illustrating an example of time slot TS in a case where synchronization processing is performed between a plurality of CSs 6 in communication system 1. Hereinafter, the n-th slot is also described as "Slot n" in time slot TS. Time slot TS includes a plurality of slots for communicating the synchronous message.

Time slot TS may be the same, and may be different, for each synchronous system. In the embodiment, time slot TS different from for each synchronous system is exemplified. As described below, FIG. 4 illustrates a detail of time slot TS in one synchronous system.

For example, synchronization control software processing unit 144 of master M generates time slot TS, and assigns one of slots included in time slot TS with respect to each slave CS 6S in the same synchronous system. That is, synchronization control software processing unit 144 of master M has a function as a slot control unit.

In slave CS 6S, PHY-LSI 11 or synchronization control software processing unit 144 obtains information of the slot assigned by master M. For example, the information of slot may be obtained by communication through LAN 3, and may be obtained from memory 12 by being stored in memory 12 that is determined in advance for each slave CS 6S. That is, PHY-LSI 11 or synchronization control software processing unit 144 of slave CS 6S has a function as an acquisition unit.

In PTP, the transmission of the synchronous messages (for example, Sync, Delay_Req, and Delay_Resp) illustrated in FIG. 3 is repeated, for example, per every one second.

In FIG. 4, synchronization control software processing unit 144 of master M divides one second that is a period of time slot TS by 100, and forms time slot TS including 100 slots. That is, synchronization control software processing unit 144 of master M assigns the time of 10 msec per one slot, and forms from 0-th slot Slot 0 to 99-th slot Slot 99. In addition, the same operation is repeated per every one second such that 0-th slot Slot 0 appears next to 99-th slot Slot 99.

In a case where a time length per one slot is 10 msec, it is possible to easily implement mounting under a specific environment (for example, environment using Linux (registered trademark) as OS). 10 msec of the time length per one slot is an example, and a time length other than 10 msec may be also adopted.

In FIG. 4, in Slot 0, between master M as the master and the entirety of slave CSs 6S (6SA, 6SB, . . . ) in the same synchronous system, the synchronous message (Sync) is communicated by the multicast manner (for example, see times T1, T2, and T2' of FIG. 3). In Slot 1, between slave CS 6SA as slave 1 and master M, the synchronous messages (Delay_Req and Delay_Resp) are communicated by the unicast manner (for example, see T3 to T6 of FIG. 3). In Slot 2, between slave CS 6SB as slave 2 and master M, the synchronous messages (Delay_Req and Delay_Resp) are communicated by the unicast manner (for example, see T3' to T6' of FIG. 3).

Similarly, in Slot 3 to Slot 99, between slave CSs (not illustrated) as slaves 3 to 99 and master M, the synchronous messages (Delay_Req and Delay_Resp) are communicated by the unicast manner. Accordingly, in FIG. 4, slave CSs of maximum 99 units are assigned.

In a case where time slot TS of FIG. 4 is used, master M can communicate the synchronous messages in an order during a certain period, between a plurality of (for example, great number) slave CSs 6S. With this, in master M, it is possible to suppress synchronization processing in master M being concentrated at one time, and temporally disperse processing load of master M. Accordingly, even in a case where master M does not exceptionally incorporate a high-performance CPU, it is possible to suppress processing delay in master M, and suppress the generation of synchronization deviation between CSs 6.

For example, in each slot illustrated in FIG. 4, the slot is different from the slot of the time division multiple access (TDMA), and a communication timing is not strictly regulated. Accordingly, even in a case where if the communication processing of the synchronous message is not terminated in one slot, the communication processing may be also continued. In this case, although influence of a degree that a processing start timing of the next slot is slightly delayed appears, the concentration of load to master M is suppressed, and the processing load of master M is dispersed.

In FIG. 4, 99-th slave CS 6S assigned in Slot 99 of one period is exemplified. However, the maximum value of the total number of slave CSs 6S is determined as 98 units such that Slot 99 may be blank. In this case, slave CS 6S for communicating the synchronous message is not assigned in Slot 99. With this, even in a case where the processing of each slot is delayed, it is possible to absorb the influence of the delay in Slot 99, and suppress the delay of processing start in the next one period.

The number of slots to be 100 in one period is exemplified in FIG. 4, but may be not 100 units.

Parallel Operation of Time Slot

Next, a configuration of communication system 1 in consideration of each synchronous system will be described. Communication system 1 includes a plurality of (for example, 10 units) synchronous systems. Each of the synchronous systems includes master M and a plurality of (for example, maximum 99 units) slave CSs 6S. Each of the synchronous systems uses individual time slot TS, and is communicated between master M and a plurality of slave CSs 6S. Master M is a part of master CS 6M. However, hereinafter, master M may be also represented as one of CSs 6.

Figure 5:
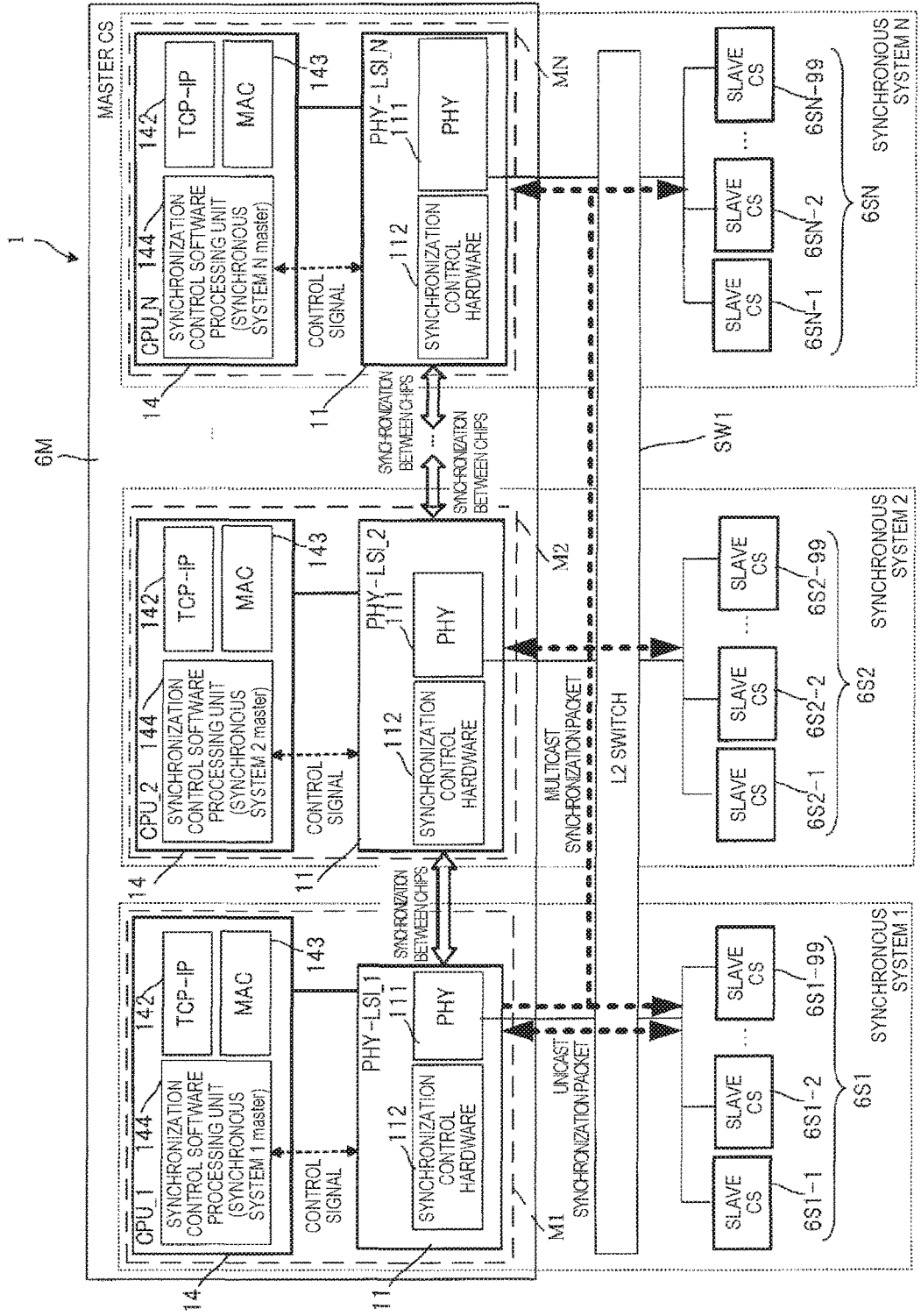
FIG. 5 is a block diagram illustrating a configuration example of a master, an L2 switch, and a plurality of slave CSs in each synchronous system of the first embodiment.

FIG. 5 is a block diagram illustrating a configuration example of master M, L2 switch SW1, and a plurality of slave CSs 6S in each of the synchronous systems. In FIG. 5, it is exemplified that there are N synchronous systems. The number of slave CSs 6S to be 99 in the synchronous systems is exemplified, but another number thereof may be implemented.

For example, master M is represented as "master MX" in synchronous system X. For example, master M in synchronous system 1 is represented as master M1, master M in synchronous system 2 is represented as master M2, and master M in synchronous system N is represented as master MN.

In FIG. 5, master MX includes CPU_X and PHY-LSI_X. CPU_X is one of CPU 14, and PHY-LSI_X is one of PHY-LSI 11. In FIG. 5, description of memory 12 incorporated in master MX is omitted.

In addition, slave CS 6S in synchronous system X is represented as "slave CS 6SX", and x slave CS 6S in synchronous system X is represented as "slave CS 6SX-x". Accordingly, for example, slave CS in synchronous system 1 is represented as slave CSs 6S1-1, 6S1-2, . . . , and 6S1-x, and slave CS in synchronous system N is represented as slave CSs 6SN-1, 6SN-2, . . . , and 6SN-x.

Slave CS 6S1-1 is an example of slave CS 6SA described above, and slave CS 6S1-2 is an example of slave CS 6SB described above.

In FIG. 5, synchronous system 1 includes master M1 and slave CSs 6S1-1, . . . , and 6S1-99. Synchronous system 2 includes master M2 and slave CSs 6S2-1, . . . , and 6S2-99. Synchronous system N includes master MN and slave CSs 6SN-1, . . . , and 6SN-99.

Master MX and slave CS 6SX are connected to each other through L2 switch SW1. L2 switch SW1 is used in common in a plurality of synchronous systems. L2 switch SW1 is a switch operated in a second layer of an OSI reference model. Respective ports of L2 switch SW1 are connected to master M and slave CS 6S of each synchronous system.

When master MX performs unicast transmission with respect to slave CS 6SX of the same synchronous system X, L2 switch SW1 transmits a synchronization signal to a port to which slave CS 6SX of a transmission destination is connected. Therefore, mixing of the synchronization signal (for example, synchronous message) is not generated between different synchronous systems. Similarly, when slave CS 6SX performs unicast transmission with respect to master MX of the same synchronous system X, L2 switch SW1 transmits the synchronization signal to a port to which master MX of the transmission destination is connected. Therefore, mixing of the synchronization signal is not generated between different synchronous systems. For example, the synchronization signal to be transmitted in the unicast manner is a unicast synchronous packet.

Meanwhile, when master MX transmits the synchronization signal in a multicast manner, L2 switch SW1 transmits the synchronization signal to the entirety of ports other than the port to which master MX is connected. That is, the synchronization signal transmitted in the multicast manner is transmitted to slave CS 6SX of the same synchronous system X, and to master M and slave CS 6S of another synchronous system, through L2 switch SW1. Accordingly, when multicast communication or unicast communication is generated in different synchronous systems at the time of performing multicast communication in a certain synchronous system, the synchronization signal interferes. For example, the synchronization signal transmitted in the multicast manner is the multicast synchronous packet.

On the contrary, in the embodiment, multicast communication is devised to be generated at a different timing in each of the synchronous systems. That is, in each of the synchronous systems, another time slot TS is individually used, without using time slot TS in common illustrated in FIG. 4.

Figure 6:
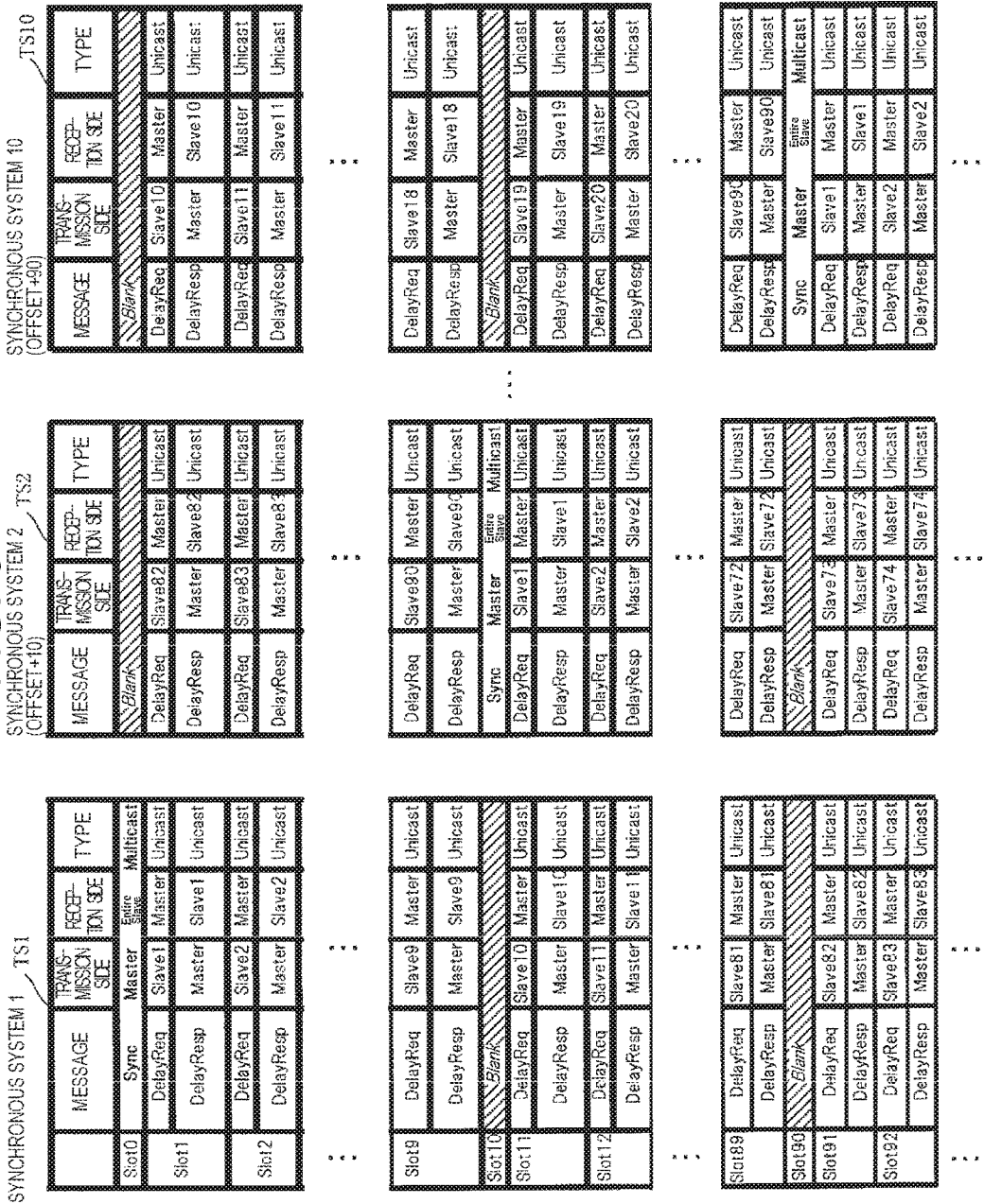
FIG. 6 is a schematic diagram illustrating an example of a time slot used by each synchronous system in the first embodiment.

FIG. 6 is a schematic diagram illustrating an example of time slot TS used in each of the synchronous systems.

In FIG. 6, some of 10 time slots TS of synchronous systems 1 to 10 are exemplified by being excerpted. In FIG. 6, in each of the synchronous systems, an order of the slot assigned in each of master M and slave CS 6S is the same, but the slot number is different. That is, when time slot TS 1 of synchronous system 1 is set as a reference, a slot position is offset and a communication timing of each CS is set to be different, in time slot TS of another synchronous system. Time slot TS 1 is the same as time slot TS illustrated in FIG. 4.

In FIG. 6, a slot position is offset by 10× (X−1) in synchronous system X. That is, in time slot TS of each of the synchronous systems, 10 slots are offset in time slot TS 2 of synchronous system 2, 20 slots are offset in time slot TS 3 of synchronous system 3 (not illustrated), and 90 slots are offset in time slot TS 10 of synchronous system 10. That is, the amounts of offset are different in each synchronous system.

Accordingly, each CPU 14 of each master M generates time slots TS (TS1, TS2, TS3, . . . ) having different offset amounts, and assigns one slot included in time slot TS with respect to own master M and each slave CS 6S of the same synchronous system.

As a result, in synchronous system 1, PHY-LSI_1 of master M1 transmits the Sync message in the multicast manner in Slot 0. In synchronous system 2, PHY-LSI_2 of master M2 transmits the Sync message in the multicast manner in Slot 10. In synchronous system 10, PHY-LSI_10 of master M10 transmits the Sync message in the multicast manner in Slot 90.

Accordingly, since each master M of each synchronous system transmits the message in the multicast manner by using a different slot, it is possible to suppress signal interference being generated between multicast communications in L2 switch SW1. Accordingly, in communication system 1, even though a large number of slave CSs 6S are installed, for example, even though the number of slave CSs 6S is 1000, since master M and slave CS 6S are separated for each synchronous system, and communication is performed by using individual time slot TS for each synchronous system, it is possible to perform communication by suppressing communication interference.

In addition, since the timings of multicast transmission are different in each master M, it is possible to suppress synchronization processing in master CS 6M being concentrated at one time, and temporally disperse processing load of master CS 6M. Accordingly, even in a case where master CS 6M does not exceptionally incorporate a high-performance CPU, it is possible to suppress processing delay in master CS 6M, and suppress the generation of synchronization deviation between CSs 6.

As illustrated in FIG. 6, in a slot in which master M in a certain synchronous system performs the multicast transmission, master M of another synchronous system may stop communication by master M or slave CS 6S of another synchronous system. With this, since communication with the other synchronous system is avoided at a timing of the multicast transmission in one synchronous system, communication system 1 can further suppress the communication interference.

Meanwhile, in the slot in which master M in a certain synchronous system performs the multicast transmission, master M or slave CS 6S of the other synchronous system may also perform the communication in the unicast manner. Even in this case, since the timing of the multicast transmission for each synchronous system is deviated, the suppression of the communication interference can be achieved.

Effect or the Like

Thus, in communication system 1, master CS 6M communicates with another communication apparatus, through LAN 3, and includes CPU 14 and PHY-LSI 11. CPU 14 generates time slot TS 1 including a plurality of slots for communicating the synchronous message used in synchronous system 1. CPU 14 generates time slot TS 2 including a plurality of slots for communicating the synchronous message used in synchronous system 2. PHY-LSI 11 transmits the synchronous message in the multicast manner in Slot 0 of time slot TS 1, in synchronous system 1. PHY-LSI 11 transmits the synchronous message in the multicast manner in Slot 10 of time slot TS 2, in synchronous system 2.

Master CS 6M is an example of the communication apparatus. LAN 3 is an example of a network. CPU 14 is an example of a processor. PHY-LSI 11 is an example of the communication device. Synchronous system 1 is an example of a first synchronous system. Synchronous system 2 is an example of a second synchronous system. Time slot TS 1 is an example of the first time slot. Time slot TS 2 is an example of the second time slot. Slot 0 is an example of the first slot. Slot 10 is an example of the second slot different from the first slot.

With this, even if L2 switch SW1 is connected between master CS 6M and slave CS 6S, since a transmission timing of a multicast signal (synchronization signal) passing through L2 switch SW1 is different for each synchronous system, it is possible to suppress generation of the communication interference in L2 switch SW1.

Accordingly, even if the number of slave CSs 6S is large (for example, 1000 units), since master CS 6M separates master M and slave CS 6S for each synchronous system, it is possible to improve synchronization accuracy between CSs 6 by being communicated by using individual time slot TS.

In addition, a special setting is not required for L2 switch SW1. In addition, since a low cost L2 switch is used when compared to L3 switch described below, it is possible to implement communication system 1 at a low cost.

In addition, PHY-LSI 11 may stop communication of the synchronous message, in Slot 0 of time slot TS 2 under the control of CPU 14.

With this, since the communication interference is further suppressed in L2 switch SW1, it is possible to further improve the synchronization accuracy between CSs 6.

Thus, communication system 1 can operate the plurality of synchronous systems in parallel by a synchronization method using time slot TS, also perform synchronization between masters M in each synchronous system, and increase the accommodation number of slave CSs 6S in communication system 1. Even in this case, it is possible to improve the synchronization accuracy between a plurality of CSs 6. In addition, by improving the synchronization accuracy, for example, even in a case where IP-DECT slave terminal 7 and each CS 6 are handed over, it is possible to reduce a possibility of generation of call disconnection.

Second Embodiment

In the second embodiment, L3 switch connected between master CS 6M and slave CS 6S is described. For example, in the embodiment, time slot TS used in each synchronous system is the same, and not offset.

Figure 7:
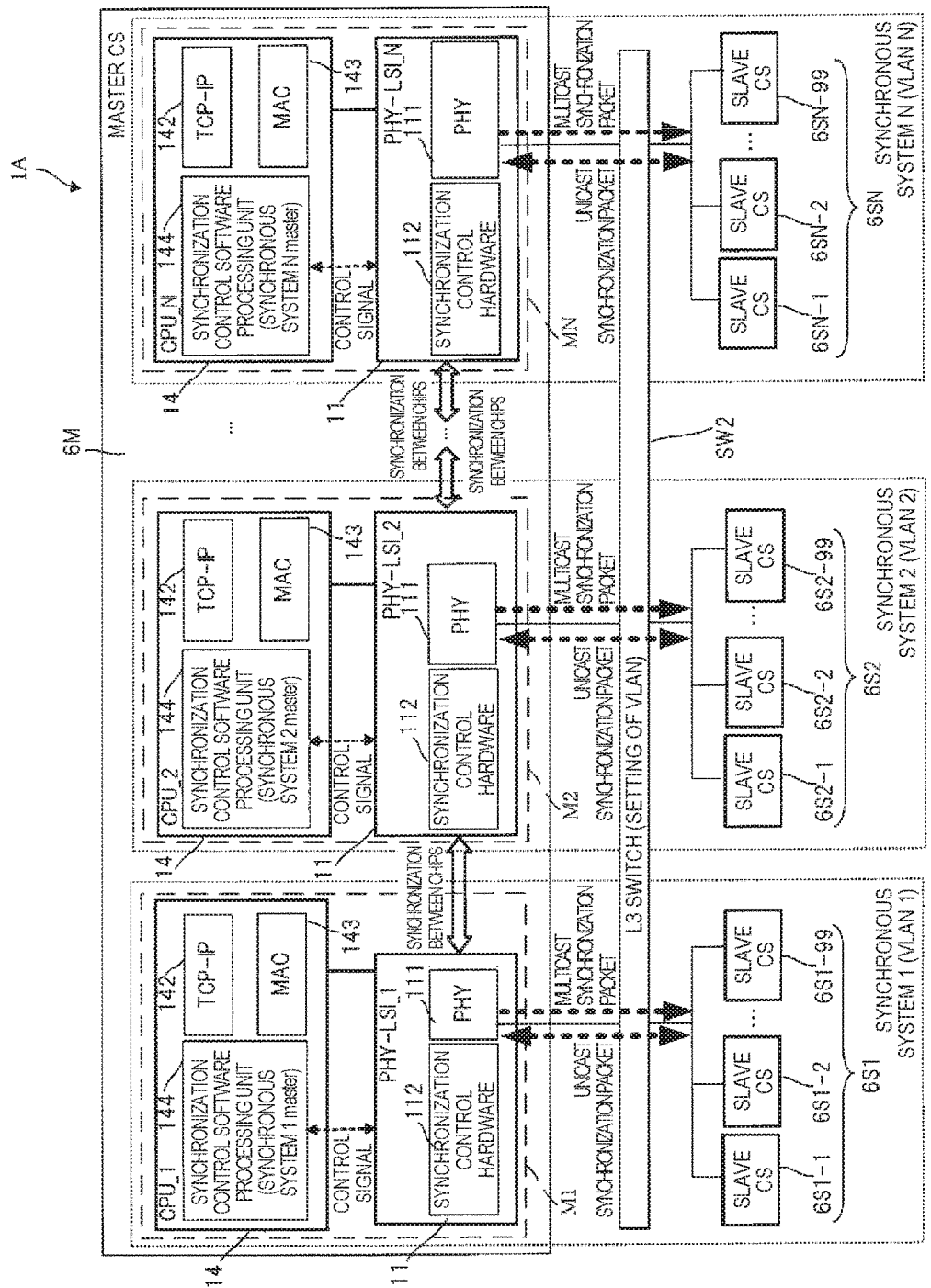
FIG. 7 is a block diagram illustrating a configuration example of a master, an L3 switch, and a plurality of slave CSs in each synchronous system of a second embodiment.

FIG. 7 is a block diagram illustrating a configuration example of master M, L3 switch SW2, and a plurality of slave CSs 6S in each synchronous system. In FIG. 7, the same configuration as that of FIG. 5 is denoted by the same reference numeral, and the description thereof is omitted or simplified.

As illustrated in FIG. 7, in communication system 1A, master M and slave CS 6S are connected to each other through L3 switch SW2. L3 switch SW2 is used in common in the plurality of synchronous systems. L3 switch SW2 is a switch operated in a third layer of the OSI reference model.

L3 switch SW2 includes a plurality of ports, a processor, a memory, and the like, although not illustrated. Each of CSs 6 is connected to each port. The memory holds various data, information, programs, or the like. For example, the processor performs various processings or controls (for example, setting of VLAN and routing control), by executing a program held in the memory.

The processor of L3 switch SW2 sets VLAN for each port. Accordingly, the plurality of ports are separated into a plurality of groups by VLAN. The setting information of VLAN is held in the memory of L3 switch SW2.

In FIG. 7, master M1 and slave CS 6S1 included in synchronous system 1 are connected to the port set in VLAN 1 of L3 switch SW2. Master M2 and slave CS 6S2 included in synchronous system 2 are connected to the port set in VLAN 2 of L3 switch SW2. Master MN and slave CS 6SN included in synchronous system N are connected to the port set in VLAN N of L3 switch SW2.

When receiving the synchronous message transmitted from master MX of synchronous system X in the multicast manner, L3 switch SW2 transmits the synchronous message to entire ports set in the same VLAN as that of the port to which master MX is connected. As a result, the synchronous message is transmitted to slave CS 6SX in the same synchronous system X. Meanwhile, since VLAN is different, the synchronous message is not transmitted to master M and slave CS 6S of the other synchronous system.

Thus, in communication system 1A, master CS 6M, a plurality of slave CSs 6S, and L3 switch SW2 are connected to each other, through LAN 3. Master CS 6M and a plurality of slave CSs 6S are separated for each synchronous system. L3 switch SW2 sets each port to which master MX and slave CS 6SX included in the same synchronous system X are connected in the same VLAN. L3 switch SW2 receives the synchronous message transmitted from master MX in the multicast manner. L3 switch SW2 transmits the synchronous message to slave CS 6SX connected to the port included in the same VLAN as that of the port to which master MX to which the synchronous message is transmitted is connected.

Master CS 6M is an example of a first communication apparatus. Slave CS 6S is an example of a second communication apparatus. L3 switch SW2 is an example of a switch for communicating the data of a third layer of the OSI reference model. VLAN is an example of a virtual network. Master MX is an example of a part of the first communication apparatus.

With this, since communication system 1A does not generate the communication interference in L3 switch SW2, without generating another time slot (for example, time slot of which slot position is offset) for each synchronous system, it is possible to suppress the generation of the communication interference due to the multicast signal.

Accordingly, even in a case where the number of slave CSs 6S is large (for example, 1000 units), since master CS 6M separates the master and slave CS for each synchronous system (VLAN) and is communicated by using the same time slot TS, it is possible to improve the synchronization accuracy between CSs 6.

In addition, by separating the synchronous system by VLAN, it is possible to suppress inflow of a packet of another synchronous system between communication systems 1A, and suppress increment of the load of CPU 14 in each synchronous system.

Third Embodiment

In the third embodiment, L2 switch having an IGMP snooping function connected between master CS 6M and slave CS 6S is described. For example, in the embodiment, time slot TS used in each synchronous system is the same, and not offset.

Figure 8:
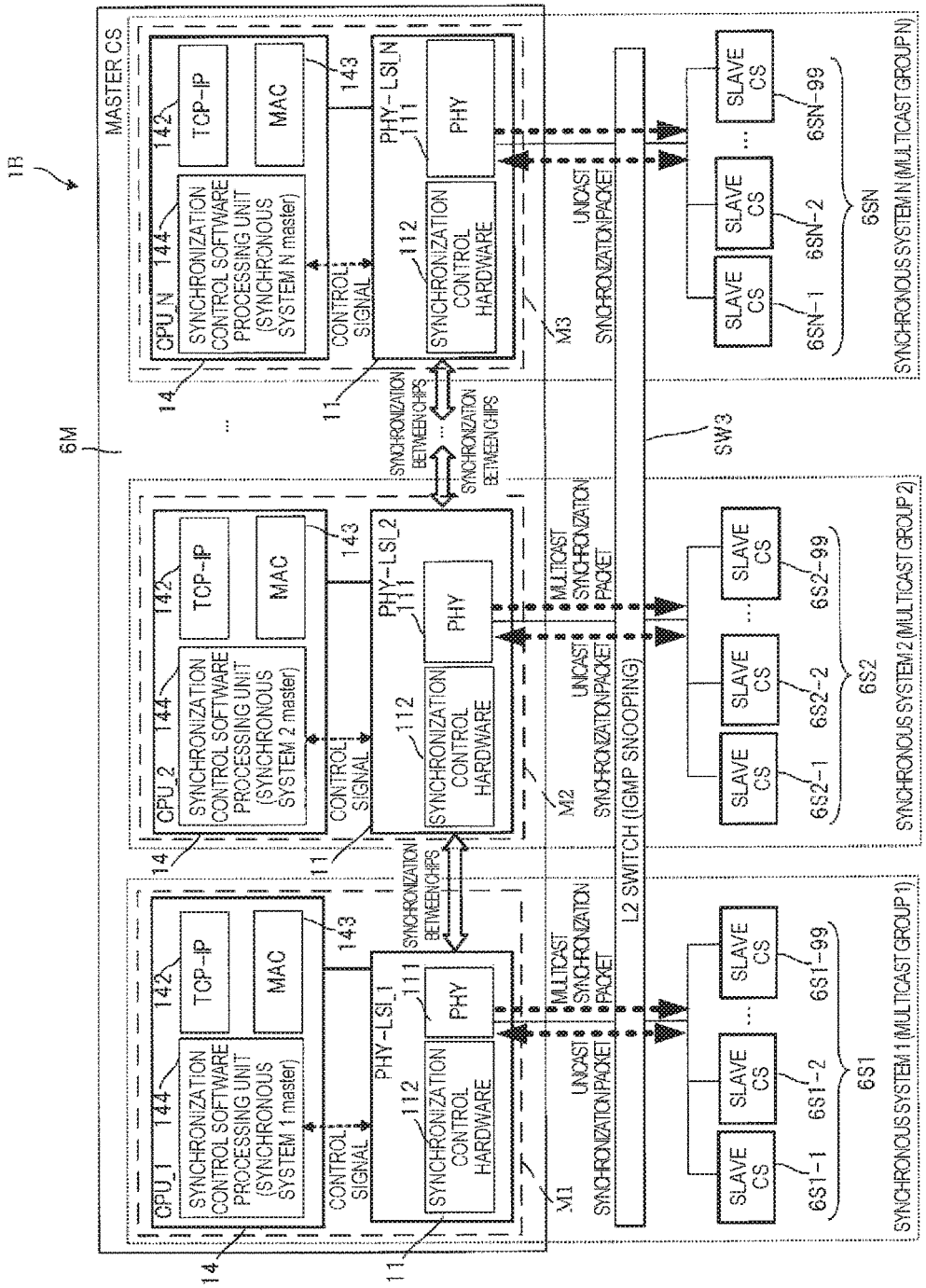
FIG. 8 is a block diagram illustrating a configuration example of a master, an L2 switch having an internet group management protocol (IGMP) snooping function, and a plurality of slave CSs, in each synchronous system of a third embodiment.

FIG. 8 is a block diagram illustrating a configuration example of master M, L2 switch SW3, and a plurality of slave CSs 6S in each synchronous system. In FIG. 8, the same configuration as that of FIG. 5 and FIG. 7 is denoted by the same reference numeral, and the description thereof is omitted or simplified.

As illustrated in FIG. 8, in communication system 1B, master MX and slave CS 6SX are connected to each other through L2 switch SW3. L2 switch SW3 is used in the plurality of synchronous systems in common. L2 switch SW3 is a switch operated in the second layer of the OSI reference model, and has the IGMP snooping function.

L2 switch SW3 includes a plurality of ports, a processor, a memory, and the like, although not illustrated. Each of CSs 6 is connected to each port. The memory holds various data, information, programs, or the like. For example, the processor performs various processings or controls (for example, validation (enabling) of IGMP snooping function, setting of multicast group, and routing control), by executing a program held in the memory.

One master MX and one or more slave CSs 6SX form a multicast group of synchronous system X. For example, an input device (not illustrated) of master MX and slave CS 6SX receive identification information (for example, multicast group X) of the multicast group based on a user operation, and CPU 14 sets the multicast group according to input information. The setting information of the multicast group is held in memory 12 of master MX and slave CS 6SX.

When the multicast group is formed, master MX transmits a predetermined control signal (multicast signal) to each slave CS 6SX included in the same multicast group. The control signal is transmitted at the time of starting communication within the synchronous system or regularly.

The processor of L2 switch SW3 performs snooping on the control signal passing through L2 switch SW3, and sets the port to which master MX of a transmission source of the control signal and each slave CS 6SX of a transmission destination are connected as the port to which a member of the multicast group is connected. L2 switch SW3 holds information of the port to which the member of the multicast group is connected in the memory of L2 switch SW3.

In FIG. 8, in L2 switch SW3, the port to which master M1 and slave CS 6S1 included in synchronous system 1 are connected is set as the port to which a member of multicast group 1 is connected. In L2 switch SW3, the port to which master M2 and slave CS 6S2 included in synchronous system 2 are connected is set as the port to which a member of multicast group 2 is connected. In L2 switch SW3, the port to which master MN and slave CS 6SN included in synchronous system N are connected is set as the port to which a member of multicast group N is connected.

When the synchronous message transmitted in the multicast manner from master MX of synchronous system X is received, L2 switch SW3 transmits the synchronous message to the entirety of ports to which a member of the same multicast group as that of master MX is connected. As a result, the synchronous message is transmitted to slave CS 6SX of the same synchronous system X. Meanwhile, since the multicast group is different, the synchronous message is not transmitted to master M and slave CS 6S of the other synchronous system.

Thus, in communication system 1B, master CS 6M, a plurality of slave CSs 6S, and L2 switch SW3 are connected to each other, through LAN 3. Master CS 6M and a plurality of slave CSs 6S are separated for each synchronous system. L2 switch SW3 monitors the control signal passing through L2 switch SW3, and sets each port to which master MX as a transmission source of the control signal and slave CS 6SX as the transmission destination of the control signal are connected as the port to which a member of the same multicast group is connected. L2 switch SW3 receives the synchronous message transmitted in the multicast manner from master MX, and transmits the synchronous message to slave CS 6SX that is a member of the same multicast group as that of master MX transmitted the synchronous message. L2 switch SW3 is an example of a switch for communicating data of the second layer of the OSI reference model.

With this, since communication system 1B does not generate the communication interference in L2 switch SW3, without generating another time slot (for example, time slot of which slot position is offset) for each synchronous system, it is possible to suppress the generation of the communication interference due to the multicast signal.

Accordingly, even in a case where the number of slave CSs 6S is large (for example, 1000 units), since master CS 6M separates the master and slave CS for each synchronous system (multicast group) and is communicated by using the same time slot TS, it is possible to improve the synchronization accuracy between CSs 6. In addition, since a low cost L2 switch is used when compared to L3 switch SW2 described below, it is possible to implement communication system 1B at a low cost.

In addition, by separating the synchronous system by the multicast group, it is possible to suppress inflow of a packet of another synchronous system between communication systems 1B, and suppress the increment of load of CPU 14 in each synchronous system.

Other Embodiment

As described above, as an example of the technology in the disclosure, the first to third embodiments are described. However, the technology in the disclosure is not limited thereto, and can be also applied to the embodiments to which changes, substitutions, additions, omissions, or the like are performed. In addition, each embodiment may be also combined.

In the first to third embodiments, master CS 6M not incorporated DECT wireless unit 10 and VoIP processing unit 141 therein is exemplified. However, master CS 6M may include DECT wireless unit 10 and VoIP processing unit 141. In addition, master CS 6M may also include display 13. That is, master CS 6M may be also implemented as a dedicated device of the synchronization processing and audio processing.

In the first to third embodiments, CPU 14 and PHY-LSI 11 individually provided for each master M, and separated by hardware are exemplified. One CPU 14 and one PHY-LSI 11 may be provided, and CPU 14 may be also performed as a function of a plurality of masters M, by executing a program held in memory 12.

In the first embodiment, the Delay_Request message and the Delay_Response message transmitted in the unicast manner are exemplified. However, a part of the Delay_Request message and the Delay_Response message may be transmitted in the multicast manner. In this case, in different time slot TS for each synchronous system, the timing of the multicast transmission is not overlapped. With this, in communication systems 1A and 1B, it is possible to suppress the communication interference due to the multicast signal.

In the second and third embodiments, the Delay_Request message and the Delay_Response message transmitted in the unicast manner are exemplified. However, the Delay_Request message and the Delay_Response message may be transmitted in the multicast manner. Even in a case of the multicast transmission, since a network is separated by L3 switch SW2 or L2 switch SW3, it is possible to suppress the communication interference due to the multicast signal in communication systems 1A and 1B.

In the first embodiment, the processor (for example, CPU 14) may be implemented as any physical configuration. In addition, if a programmable processor is used, since processing content can be further changed by changing the program, it is possible to increase the degree of freedom of processor design. The processor may be configured as one semiconductor chip, and may be also physically configured as a plurality of semiconductor chips. In a case of being configured as a plurality of semiconductor chips, the first to the third embodiments may be also controlled by different semiconductor chips, respectively. In this case, it is also possible that one processor is configured with these plurality of semiconductor chips. In addition, the processor may be configured with a member (capacitor or the like) having a function different from the semiconductor chip. In addition, in order to realize a function other than the function of the processor, one semiconductor chip may be configured. In addition, a plurality of processors may be configured as one processor.

What is claimed is:
1. A communication system comprising:
 a first communication device that communicates in a first synchronous system via a network;
 a second communication device that communicates in a second synchronous system via the network; and
 a plurality of third communication devices that communicate in at least the first synchronous system or the second synchronous system via the network;
 wherein the first communication device generates a first time slot including a plurality of slots for communicating a synchronous message used in the first synchronous system and transmits the synchronous message in a multicast manner in a first slot,
 wherein the second communication device generates a second time slot including a plurality of slots for communicating a synchronous message used in the second synchronous system and
 transmits the synchronous message in the multicast manner in a second slot different from the first slot, and
 wherein the first communication device generates the first time slot at a same time the second communication device generates the second time slot, and the slots of the first time slot respectively correspond with the slots of the second time slot.

2. The communication system of claim 1, wherein the first communication device stops communication when the second communication device transmits the synchronous message, and the second communication device stops communication when the first communication device transmits the synchronous message.

3. The communication system of claim 1, wherein the first communication device and second communication device transmit the synchronous message to all of the plurality of third communication devices.

4. The communication system of claim 1, wherein the first communication device communicates in a unicast manner with a first one of the third communication devices when the second communication device transmits the synchronous message, and the second communication device communicates in the unicast manner with a second one of the third communication devices when the first communication device transmits the synchronous message.

\* \* \* \* \*